US009076011B2

(12) United States Patent
Sasaki

(10) Patent No.: US 9,076,011 B2
(45) Date of Patent: Jul. 7, 2015

(54) SECRET INFORMATION LEAKAGE PREVENTION SYSTEM, SECRET INFORMATION LEAKAGE PREVENTION METHOD AND SECRET INFORMATION LEAKAGE PREVENTION PROGRAM

(75) Inventor: Takayuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/695,543

(22) PCT Filed: Jun. 1, 2011

(86) PCT No.: PCT/JP2011/062597
§ 371 (c)(1),
(2), (4) Date: Oct. 31, 2012

(87) PCT Pub. No.: WO2011/162079
PCT Pub. Date: Dec. 29, 2011

(65) Prior Publication Data
US 2013/0055359 A1  Feb. 28, 2013

(30) Foreign Application Priority Data

Jun. 25, 2010 (JP) ................................. 2010-145099

(51) Int. Cl.
| | |
|---|---|
| H04L 29/06 | (2006.01) |
| G06F 21/62 | (2013.01) |
| G06F 7/04 | (2006.01) |
| G06F 17/30 | (2006.01) |

(52) U.S. Cl.
CPC .......... *G06F 21/6218* (2013.01); *H04L 63/105* (2013.01); *G06F 2221/2113* (2013.01)

(58) Field of Classification Search
CPC .......... G06F 2221/2113; G06F 21/556; G06F 21/606; G06F 21/6209; G06F 21/6218; H04L 63/08; H04L 63/105
See application file for complete search history.

(56) References Cited

U.S. PATENT DOCUMENTS

| | | | | |
|---|---|---|---|---|
| 5,935,248 | A * | 8/1999 | Kuroda | 726/14 |
| 2003/0061518 | A1* | 3/2003 | Yamaguchi et al. | 713/201 |
| 2003/0105979 | A1* | 6/2003 | Itoh et al. | 713/201 |
| 2007/0255942 | A1* | 11/2007 | Weller et al. | 713/151 |
| 2009/0287922 | A1* | 11/2009 | Herwono et al. | 713/155 |
| 2010/0107222 | A1* | 4/2010 | Glasser | 726/3 |
| 2010/0115584 | A1* | 5/2010 | Gotou | 726/3 |

FOREIGN PATENT DOCUMENTS

| | | |
|---|---|---|
| JP | 2000-174807 A | 6/2000 |
| JP | 2003-22189 A | 1/2003 |

(Continued)

*Primary Examiner* — Dede Zecher
*Assistant Examiner* — Trang Doan
(74) *Attorney, Agent, or Firm* — Sughrue Mion, PLLC

(57) ABSTRACT

Provided is a system in which two or more clients, each including an application program that transmits a network access request, and a server are able to communicate, wherein at least one client includes first control means for controlling the access request transmitted to the server, based on a security level assigned to the application program, and the server includes second control means for determining whether the first control means has been introduced to the client that has transmitted the access request, authorizing the access request when the determination result is positive, and controlling the access request based on a security level assigned to an access target when the determination result is negative.

12 Claims, 12 Drawing Sheets

(56) References Cited

FOREIGN PATENT DOCUMENTS

| | | |
|---|---|---|
| JP | 2003-173284 A | 6/2003 |
| JP | 2006-251932 A | 9/2006 |
| JP | 2007-287097 A | 11/2007 |
| JP | 2007-334386 A | 12/2007 |
| JP | 2010-15329 A | 1/2010 |

* cited by examiner

Fig. 3

| PROCESS ID | LABEL |
|---|---|
| 123 | SECRET |
| 456 | PUBLIC |
| ..... | ..... |

Fig. 4

| SEVER/FOLDER | LABEL |
|---|---|
| serverA/secret_folder | SECRET |
| serverA/public_folder | PUBLIC |
| serverB/public_folder | PUBLIC |
| ..... | ..... |

Fig. 5

|  | SECRET FOLDER | PUBLIC FOLDER |
|---|---|---|
| SECRET APPLICATION | ACCESS AUTHORIZED | READ-ONLY AUTHORIZED |
| PUBLIC APPLICATION | ACCESS PROHIBITED | ACCESS AUTHORIZED |

Fig. 7

| AUTHENTICATION-REQUIRED SERVER LIST |
|---|
| IP ADDRESS 1 |
| IP ADDRESS 2 |
| ...... |

Fig. 8

| CLIENT IP ADDRESS | REMAINING VALID TIME |
|---|---|
| XXX.XXX.X.X | 56 |
| XXX.XXX.X.X | 78 |
| ..... | ..... |

SECRET INFORMATION LEAKAGE PREVENTION SYSTEM, SECRET INFORMATION LEAKAGE PREVENTION METHOD AND SECRET INFORMATION LEAKAGE PREVENTION PROGRAM

CROSS REFERENCE TO RELATED APPLICATIONS

This application is a National Stage of International Application No. PCT/JP2011/062597, filed on Jun. 1, 2011, which claims priority from Japanese Patent Application No. 2010-145099, filed on Jun. 25, 2010, the contents of all of which are incorporated herein by reference in their entirety.

BACKGROUND

The present invention relates to technology for preventing leakage of secret information and, more particularly, to technology for preventing leakage of secret information using multilevel security.

A multilevel security system (MLS) that assigns a label for specifying a security level to a subject who performs access or an access target and limits access to the access target based on the assigned label is known. For example, Patent Document 1 (Patent Publication JP-A-2003-173284) discloses a network system in which, when a client terminal assigns a label indicating a level of secrecy to a file in the client terminal and transmits the file with the label to the outside, a transmission management program of a gateway server checks the label of the file and transmits the file to a network outside an organization when the level of secrecy is not "secret". Patent Document 2 (Patent Publication JP-A-2000-174807) discloses a configuration in which a computer system has an operating system kernel that supports a multilevel access control security mechanism to produce an object access packet.

Further, technology for preventing leakage of secret information in a network is known. For example, Patent Document 3 (Patent Publication JPA-2006-251932) discloses a configuration in which a host device executes user authentication by referencing an authentication history in the host device when the host device cannot access a security management server in a configuration in which the security management server in a network performs authentication. Patent Document 4 (Patent Publication JP-A-2007-287097) discloses a configuration in which, when there is an access request from a client terminal to a server, a blocking device recognizes successful authentication when an IP address of the client terminal is contained in access management information, and authorizes the access request, and the blocking device recognizes failed authentication when the IP address of the client terminal is not contained in the access management information and blocks the access request.

[Patent Document 1] Patent Publication JP-A-2003-173284
[Patent Document 2] Patent Publication JP-A-2000-174807
[Patent Document 3] Patent Publication JP-A-2006-251932
[Patent Document 4] Patent Publication JP-A-2007-287097

When the configuration disclosed in Patent Documents 1 and 2 is applied to build a network-attached multilevel security system, a gateway or a server collectively performs access control. Accordingly, there are problems in that a load of the gateway or the server increases and communication speed is reduced when there are a number of client terminals.

Further, in the configuration described in Patent Document 3, when a host device cannot access a security management server, the host device executes user authentication by referencing an authentication history in the host device. Accordingly, for example, when the authentication history is not stored in the host device, a user successfully authenticated when authenticated in a security management server fails in the authentication, thus lacking convenience of a user task. Further, in the configuration disclosed in Patent Document 4, when the authentication of the client terminal has failed, an access request is blocked. Accordingly, for example, when the client terminal has failed in authentication due to being brought from the outside of a company, the client terminal does not access a server of a company and convenience of a user task is insufficient.

SUMMARY

Accordingly, an exemplary object of the present invention is to provide a network-attached multilevel security system capable of performing high-speed communication and improving convenience of a user task even when there are a number of client terminals.

The present secret information leakage prevention system is a secret information leakage prevention system in which two or more clients, each including an application program that transmits a network access request, and a server are able to communicate via a network, wherein: at least one of the two or more clients includes first network access control means for controlling the network access request transmitted from the application program to the server, based on a security level assigned to the application program, and the server includes second network access control means for determining, in response to the network access request transmitted from one of the two or more clients, whether the first network access control means has been introduced to the client that has transmitted the network access request, authorizing the network access request when the determination result is positive, and controlling the network access request based on a security level assigned to an access target of the network access request when the determination result is negative.

Further, the client including the first network access control means includes first authentication means for executing an authentication process of authenticating, with the server, that the first network access control means has been introduced, the server includes second authentication means for executing the authentication process with the client including the first network access control means, and registering the client as an authenticated client when the authentication process is successful, and the second network access control means determines, when the client having transmitted the network access request is registered as the authenticated client, that the first network access control means has been introduced to the client.

Further, the second network access control means sets a provisional security level for the application that has transmitted the network access request when the determination result is negative and controls the network access request based on the set provisional security level and the security level assigned to the access target.

Further, the first authentication means executes the authentication process with the second authentication means using a key held in the first network access control means.

Further, the first authentication means includes: first transmission means for transmitting a first challenge code generated using a first random number to the server; a first reception means for receiving a first response code and a second challenge code based on the first challenge code that are transmitted from the server; first response code generation means for generating a first response code based on a first key held in the first network access control means and the generated first challenge code; first determination means for determining whether the first response code received by the first reception means matches the first response code generated by the first response code generation means; and second transmission means for transmitting a second response code generated from the second challenge code received by the first reception means to the server when the determination result from the first determination means is positive, and the second authentication means includes: third transmission means for transmitting, to the client, a first response code generated using a second key held in the second authentication means from the first challenge code transmitted from the first client and a second challenge code generated using a second random number; second reception means for receiving the second response code based on the second challenge code and transmitted from the first client; second response code generation means for generating a second response code based on the second key and the generated second challenge code; and second determination means for determining whether the second response code transmitted from the first client matches the second response code generated by the second response code generation means, and regarding the authentication process as being successful when the determination result is positive.

Further, the first authentication means executes the authentication process with the server on the condition that the first network access control means is in operation.

Further, the first authentication means acquires a list of processes in execution from an operating system, and determines whether the first network access control means is in operation by confirming whether the first network access control means is included in the acquired process list.

Further, the present secret information leakage prevention method is a secret information leakage prevention method in a secret information leakage prevention system in which two or more clients, each including an application program that transmits a network access request, and a server are able to communicate via a network, wherein: at least one of the two or more clients executes a first network access control step of controlling the network access request transmitted from the application program to the server, based on a security level assigned to the application program, and the server executes a second network access control step of determining, in response to the network access request transmitted from one of the two or more clients, whether the first network access control step is executed in the client that has transmitted the network access request, authorizing the network access request when the determination result is positive, and controlling the network access request based on a security level assigned to an access target of the network access request when the determination result is negative.

Further, the present program causes at least one of two or more clients, each including an application program that transmits a network access request to execute a first network access control step of controlling the network access request transmitted from the application program to the server, based on a security level assigned to the application program, and causes the server to execute a second network access control step of determining, in response to the network access request transmitted from one of the two or more clients, whether the first network access control step is executed in the client that has transmitted the network access request, authorizing the network access request when the determination result is positive, and controlling the network access request based on a security level assigned to an access target of the network access request when the determination result is negative.

Further, the program of the present invention may be stored in any recording medium, such as an optical disc such as a CD-ROM, a magnetic disk, or a semiconductor memory. Further, the program of the present invention may be downloaded via the recording medium or a communication network and installed in or loaded on a computer.

Further, in this disclosure, the means does not simply mean physical means, and includes a case in which a function of the means is realized by software. Further, even when a function of one means is realized by two or more physical means, functions of the two or more means may be realized by one physical means.

According to an exemplary aspect of the present invention, it is possible to provide a network-attached multilevel security system capable of performing high-speed communication and improving convenience of a user task even when there are a number of client terminals.

DESCRIPTION OF THE DRAWINGS

FIG. 3 is a diagram illustrating an example of a label allocation list.

FIG. 4 is a diagram illustrating an example of a data structure of a server information storage unit.

FIG. 5 is a diagram illustrating an example of a data structure of an access control rule storage unit.

FIG. 7 is a diagram illustrating an example of a data structure of an authentication-required server list.

FIG. 8 is a diagram illustrating an example of an authenticated client list.

EXEMPLARY EMBODIMENT

Hereinafter, exemplary embodiments of the present invention will be described in detail with reference to the drawings. Further, an overlapping description of the same elements may be omitted.

<System Configuration>

Figure 1:
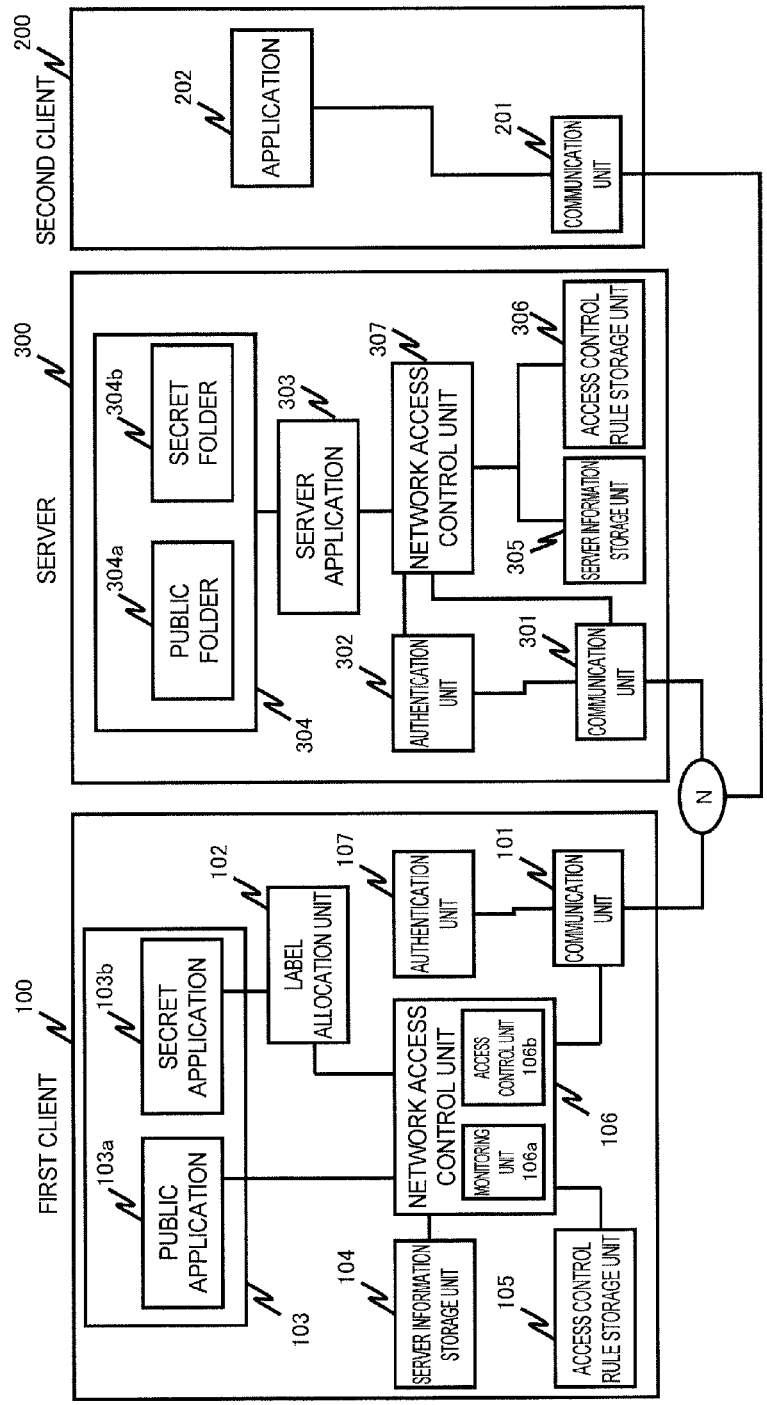
FIG. 1 is a diagram illustrating a schematic configuration of a secret information leakage prevention system according to a first embodiment.

FIG. 1 illustrates a schematic configuration of a client-server system to which a secret information leakage prevention system according to the present embodiment is applied. The present system includes a first client 100, a second client 200, and a server 300. The first client 100 and the server 300, and the second client 200 and the server 300 are connected with each other via a network N. The network N may be, for example, any one of the Internet, a dedicated line, a packet communication network, a telephone line, a LAN, an intranet, another communication line, and a combination thereof, and may be wired or may be wireless.

Further, one first client 100 and one second client 200 are illustrated in FIG. 1, but the number of first clients 100 and second clients 200 may be appropriately set according to a design. For example, a plurality of first clients 100 and/or a plurality of second clients 200 may be connected to the server 300. Further, while one server 300 is illustrated in FIG. 1, the number of servers 300 may be appropriately set according to a design. For example, the first client 100 or the second client 200 may access a plurality of servers 300.

Here, a main difference between the first client 100 and the second client 200 is in presence or absence of a configuration for realizing multilevel security (e.g., a network access control unit). The first client 100 and the second client 200 will be described in detail below but, for example, since the first client 100 is under management of a company, the first client 100 corresponds to a PC to which a configuration for realizing multilevel security has been introduced. On the other hand, since the second client 200 is brought from the outside of the company (i.e., not under management of the company), the second client 200 corresponds to a PC to which the configuration for realizing multilevel security has not been introduced.

Figure 2:
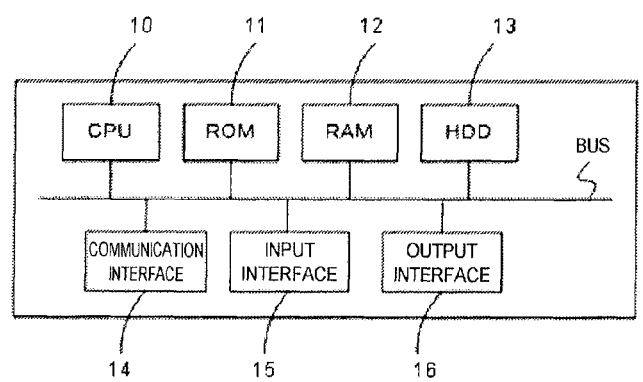
FIG. 2 is a diagram illustrating an example of a hardware configuration of the secret information leakage prevention system.

Next, the first client 100 will be described. The first client 100 may be a dedicated or general-purpose computer including hardware such as a CPU 10 as a control unit that controls a process and operation of the first client 100, a memory such as a ROM 11 or a RAM 12, an external storage device (HDD) 13 that stores various pieces of information, a communication interface 14 that controls communication with the server 300 via the network N, an input interface 15 such as a keyboard, an output interface 16 such as a display, and a bus that connects them, as illustrated in FIG. 2. The ROM 11, the RAM 12 or the external storage device 13 is referred to simply as a storage device. The first client 100 may, for example, function as various function realization units such as a label allocation unit 102, a network access control unit 106, and an authentication unit 107, which will be described below, as the CPU 10 executes a predetermined program stored in the memory or the external storage device 13.

Returning to FIG. 1, the first client 100 includes a communication unit 101, a label allocation unit 102, an application 103 (a public application 103a, and a secret application 103b), a server information storage unit 104, an access control rule storage unit 105, a network access control unit 106, and an authentication unit 107.

The communication unit (communication means) 101 is configured to be able to communicate with the server 300 or other devices that are not shown via the network N and input or output information. The communication unit 101 includes, for example, an existing communication module such as a network interface card (NIC) or a TCP/IP driver.

Figure 3:
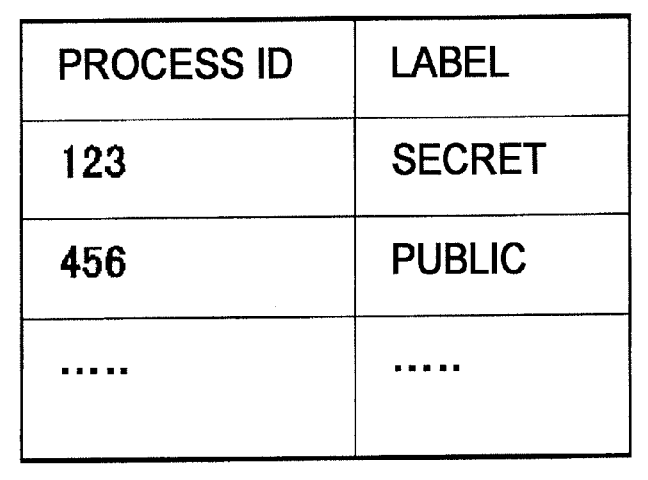

The label allocation unit (label allocation means) 102 is configured to be able to assign information indicating a security level (hereinafter referred to as a "label") to the application 103. The label allocation unit 102 stores a list in which the application 103 is associated with the label assigned to the application 103 (a label assignment list) in a predetermined storage area. As the label, for example, two types of labels such as "public" in which security is low and "secret" in which security is high may be assigned. FIG. 3 illustrates an example of a data structure of the label assignment list. In the label assignment list, a process ID (a process number) that identifies the application is associated with the label assigned to the application. Further, content of the label is not limited to that illustrated in FIG. 3 and may be appropriately set according to a design. For example, there may be three or more types of labels.

Further, the label allocation unit 102 is configured to read the label assigned to the application from the label assignment list and notify of the label when an inquiry for the label assigned to a predetermined application is received from the network access control unit 106. Further, the label assigned by the label allocation unit 102 may also be used to prohibit information distribution from the secret application 103b to the public application 103a in the first client 100.

The application 103 (the public application 103a and the secret application 103b) is application software that is stored, for example, in the external storage device 13 and executed by the CPU 10 so that a predetermined function is provided to a user, and transmits a network access request to the server 300. The application 103 is not particularly limited and, for example, corresponds to existing software such as an editor having a document creation function or a browser having an information browsing function, and is identified according to content of the label. In the present embodiment, the application 103 is classified into, for example, an application 103a to which the public label is assigned (a public application) and an application 103b to which the secret label is assigned (a secret application).

The server information storage unit (server information storage means) 104 is a storage device that stores server information in which an access target of the application 103 is associated with information of the label assigned to the access target (referred to as access target management information). The server information storage unit 104 functions as a database. When the server information storage unit 104 receives a predetermined request containing information for specifying the access target from the network access control unit 106, the server information storage unit 104 is configured to search the server information for the label assigned to the access target and notify the network access control unit 106 of a search result. For example, two types of "public" and "secret" may be assigned as the label assigned to the access target. However, content of the label may be appropriately set according to a design, and there may be three or more types of labels.

FIG. 4 illustrates an example of a data structure of the server information storage unit 104. As illustrated in FIG. 4, folder information of the server and information of the label are stored to be associated with each other in the server information storage unit 104. For example, a "secret" label is assigned to a secret folder "server A/secret_folder" of the server A, and a "public" label is assigned to the public folder "server A/public_folder" of the server A. Further, the data structure of the server information storage unit 104 is not limited to that illustrated in FIG. 4. For example, as information capable of uniquely specifying the server, an IP address may be used in place of a server name. Further, when the security levels are two levels of "secret" and "public," the "secret" label is set for only the secret folder, and a label of a folder for which a "secret" label has not been set may be regarded as "public."

Returning to FIG. 1, the access control rule storage unit (access control rule storage means) 105 is a storage device that stores information (an access control rule) for limiting access to an access target of the application 103. The access control rule storage unit 105 is not particularly limited, and for example, stores restrictions of control of access to each access target for each application. The restrictions may be appropriately set and changed according to a design.

FIG. 5 illustrates an example of a data structure of the access control rule storage unit. As illustrated in FIG. 5, "access authorized" is set in control content from a secret application to a secret folder and "reading authorized" is set in control content from a secret application to a public folder.

Meanwhile, "access prohibited" is set in control content from a public application to a secret folder and "access authorized" is set in control content from a public application to a public folder.

Returning to FIG. 1, the network access control unit (network access control means) 106 includes a network monitoring unit 106a (hereinafter referred to as a "monitoring unit") that monitors network communication executed via the communication unit 101, and an access control unit 106b that executes application access control. The network access control unit 106 may be configured of a program (a network access control program) that provides a function of monitoring network communication or a function of executing the application access control as the program is stored in, for example, an external storage device 13 and executed by the CPU 10.

Figure 6:
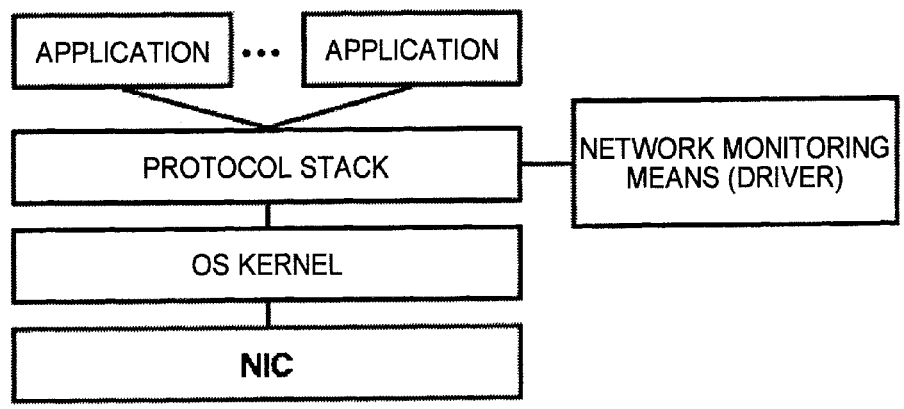
FIG. 6 is a diagram illustrating an example of mounting of a network monitoring unit.

The monitoring unit (monitoring means) 106a is configured to monitor all network access using an application 103. The monitoring unit 106a may be realized by monitoring an event, for example, by applying related art such as a filter driver called a TDI (Transport Driver Interface) driver or an NDIS (Network Driver Interface Specification) driver. FIG. 6 is a diagram illustrating an example of a monitoring unit 106a (a network access control unit 106) mounted on the secret information leakage prevention system.

The access control unit (access control means) 106b is configured to be able to execute access control based on multilevel security for the network access when network access of the application 103 is detected by the monitoring unit 106a. Specifically, the access control unit 106b extracts application specifying information (e.g., a process ID) for specifying an application and access target information (e.g., a folder name) for specifying an access target from the detected access. Next, the access control unit 106b acquires the label of the application from the label allocation unit 102 based on the extracted process ID, and the label of the folder from the server information storage unit 104 based on the folder name. Also, the access control unit 106b performs access control for network access of the application 103 by referencing the access control rule from the access control rule storage unit 105 based on the acquired label of the application 103 and the acquired label of a folder 304.

Further, the access control unit 106b holds a list of servers 300 to which an authentication unit 302 has been introduced (an authentication-required server list) in a predetermined storage area. The access control unit 106b is configured to determine whether the authentication is required between the first client 100 and the server 300 that is an access target by referencing the authentication-required server list. FIG. 7 is a diagram illustrating an example of a data structure of the authentication-required server list. The structure of the authentication-required server list is not particularly limited and, for example, an IP address or a DNS name is stored as information capable of uniquely specifying a server.

Further, the access control unit 106b holds a key for authentication for proving that the network access control unit 106 has been introduced to the first client 100 in a predetermined storage area. The predetermined key is the same as the key for authentication held in the authentication unit 302 of the server 300.

The authentication unit (authentication means) 107 is a unit for authenticating that the network access control unit 106 has been introduced to the first client 100 and is configured to be able to execute a predetermined authentication process with the server 300. The authentication unit 107 communicates with the authentication unit 302 of the server 300 using the key for authentication held in the network access control unit 106, and performs a predetermined authentication process. The authentication unit 107 notifies the network access control unit 106 of an authentication processing result. The authentication process is not particularly limited to the method, and for example, an authentication process according to a challenge-response scheme is executed herein. Further, the authentication process will be described in detail.

Further, the authentication unit 107 is configured to determine whether the network access control unit 106 is in operation. The determination as to whether the network access control unit 106 is in operation is not particularly limited to such content. For example, the determination may be made by acquiring a list of processes in execution from an operating system and confirming whether the process ID of the network access control unit 106 is included in the acquired process list.

Next, the second client 200 will be described. As illustrated in FIG. 1, the second client 200 includes a communication unit 201 and an application 202. The communication unit 201 has a configuration similar to the communication unit 101 of the first client 100, and the application 202 has a configuration similar to the application 103 of the first client 100 except that a label is assigned. Accordingly, a detailed description thereof will be omitted. Further, since a hardware configuration of the second client 200 is similar to the hardware configuration of the first client 100 described with reference to FIG. 2, a description thereof will be omitted.

Next, the server 300 will be described. The server 300 includes a communication unit 301, an authentication unit 302, a server application 303, a folder 304 (a public folder 304a and a secret folder 304b), a server information storage unit 305, an access control rule storage unit 306, and a network access control unit 307. Further, the server 300 may be a dedicated or general-purpose server computer having hardware such as a CPU that controls a process and operation of the server 300, a memory such as a ROM or a RAM, an external storage device that stores various pieces of information, a communication interface, an input/output interface and a bus that connects them, similar to the hardware configuration of the first client 100 described with reference to FIG. 2.

The communication unit (communication means) 301 is configured to be able to communicate with the first client 100, the second client 200, and other devices that are not shown, via a network N, and input or output information. For example, the communication unit includes an existing communication module such as a network interface card (NIC) or a TCP/IP driver.

The authentication unit (authentication means) 302 is configured to be able to execute a predetermined authentication process with the first client 100 in order to authenticate that the network access control unit 106 has been introduced to the first client 100. Specifically, the authentication unit 302 holds the same key as the key for authentication held in the network access control unit 106 of the first client 100. The authentication unit 302 performs communication with the authentication unit 107 of the first client 100 using the key for authentication to perform a predetermined authentication process.

Further, the authentication unit 302 produces a list of the first clients 100 that are successfully authenticated (an authenticated client list). FIG. 8 is a diagram illustrating an example of a configuration of the authenticated client list. Content of the authenticated client list is not particularly limited, but the authenticated client list contains an IP address of a client as identification information for uniquely identifying the first authenticated client 100, as illustrated in FIG. 8. When the first client 100 is successfully authenticated, the authentication unit 302 adds the first client 100 to the authenticated client list. Further, in FIG. 8, a time for which the first client 100 is valid as an authenticated client (a remaining valid time) is stored to be associated with the IP address. The remaining valid time will be described in detail.

Returning to FIG. 1, the server application 303 is application software that provides predetermined network service as the server application 303 is stored in, for example, an external storage device and executed by a CPU. The server application 303 is not particularly limited and, for example, corresponds to an existing program with an FTP (File Transfer Protocol) or a CIFS (Common Internet File System).

The folder 304 stores data that is an access target and is also called a directory. The folder 304 is identified by an assigned label. In the present embodiment, for example, the folder is classified into a folder 304a to which a public label has been assigned (a public folder) and a folder 304b to which a secret label has been assigned (a secret folder). Public information is stored in the public folder, and secret information is stored in the secret folder. Further, content of the label is not limited to the two types and may be appropriately set according to a design. A correspondence relationship of the folder 304 and the label is stored in the server information storage unit 305 (104) (see FIG. 4).

The server information storage unit (server information storage means) 305 is a storage device that stores server information (access target management information) in which an access target of the application 103 is associated with information of a label assigned to the access target, similar to the server information storage unit 104 of the first client 100. When the server information storage unit 305 receives a predetermined request containing information for specifying an access target from the network access control unit 307, the server information storage unit 305 searches the server information for the label assigned to the access target and notifies the network access control unit 307 of a search result. Further, since a data structure of the server information storage unit 305 is the same as that of the server information storage unit 104 of the first client 100, a detailed description thereof will be omitted (see FIG. 4).

The access control rule storage unit (access control rule storage means) 306 is a storage device that stores an access control rule to limit access to the access target of the application 103, similar to the access control rule storage unit 105 of the client. The access control rule storage unit 306 notifies an access control rule in response to the inquiry from the network access control unit 307. Further, since the server information storage unit 104 of the first client 100 and the server information storage unit 305 of the server 300 hold the same access control rule, a detailed description thereof will be omitted (see FIG. 5).

The network access control unit (network access control means) 307 determines whether the network access control unit has been introduced to the client that has transmitted the network access request in response to the network access to the server application 303. If the determination result is positive, the network access control unit directly authorizes the network access and if the determination result is negative, the network access control unit executes access control for the network access. Specifically, the network access control unit 307 monitors network access to the server application 303. When the network access control unit 307 detects the network access, the network access control unit 307 specifies the client that performs the network access and inquires of the authentication unit 302 about whether the specified client is an authenticated client. If the authentication result is positive (authentication has been completed), the network access control unit 307 determines that the network access control unit has been introduced to the client and does not execute the access control (causes the access to be directly executed). On the other hand, when the authentication result is negative (authentication has not been completed), the network access control unit 307 determines that the network access control unit has not been introduced to the client, and executes the access control (e.g., authorization, prohibition, and read-only authorization) according to the folder that is the access destination.

Further, in the access control in the network access control unit 307, a provisional label is set for an application to be accessed, and the access control is performed based on the set provisional label of the application and the label of the folder that is an access destination. The access control of the network access control unit 307 will be described in detail.

<Flow of Secret Information Leakage Prevention Process>

Figure 9:
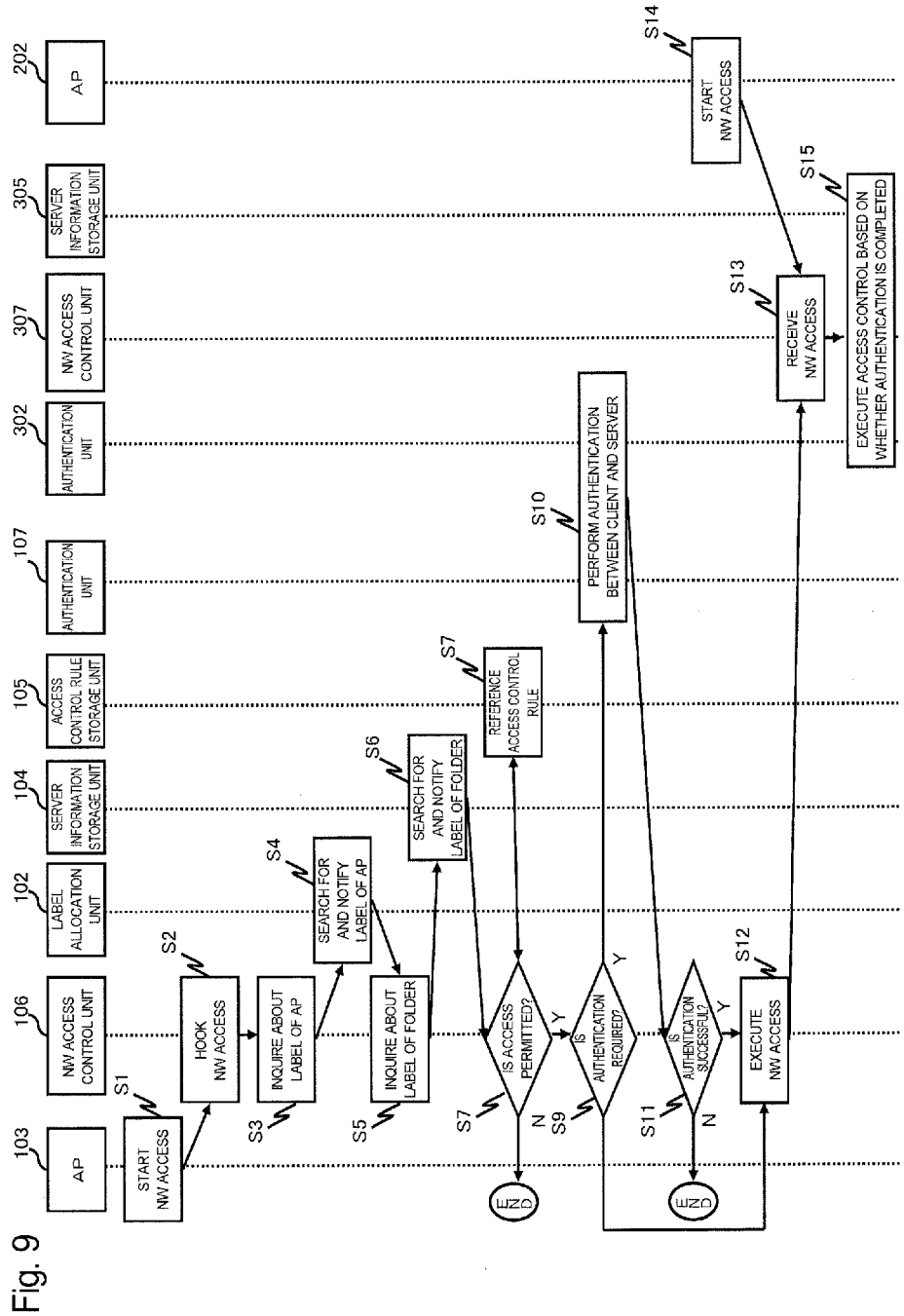
FIG. 9 is a flowchart illustrating an example of a flow of a secret information leakage prevention process.

A secret information leakage prevention process in the secret information leakage prevention system according to the present embodiment will be described with reference to FIG. 9. Further, process steps shown in the flowcharts of FIGS. 9 to 11 may be executed in an arbitrarily changed order or in parallel without causing contradiction of processing content. Further, another step may be added between the process steps. Further, a step described as a single step for convenience may be divided into a plurality of steps and executed, and steps described as a plurality of divided steps for convenience may be recognized as a single step. Hereinafter, for convenience of description, network access to the server 300 from the first client 100 will first be described and then network access to the server 300 from the second client 200 will be described.

First, the network access to the server 300 from the first client 100 will be described. It is assumed that the monitoring unit 106a of the network access control unit 106 of the first client 100 starts monitoring of network communication, for example, at a predetermined timing such as power-up.

The application 103 (103a or 103b) executed by the control unit (CPU) starts network access (NW access) to an access target in a network designated, for example, according to an instruction by a user's manipulation (step S1).

The monitoring unit 106a of the network access control unit 106 hooks the network access of the application 103 (103a or 103b) (also referred to as a network access event) (step S2).

Next, the access control unit 106b of the network access control unit 106 acquires application information (e.g., a process number) for specifying the application 103 from the hooked access, and inquires of the label allocation unit 102 about a label of the application 103 (103a or 103b) based on the application information (step S3).

The label allocation unit 102 searches the label assignment list (see FIG. 3) stored therein for the label assigned to the application (AP) 103 (103a or 103b) specified by the application information, and notifies the access control unit 106b of a search result (step S4).

When the access control unit 106b acquires the label of the application 103 from the label allocation unit 102, the access control unit 106b acquires access destination information for specifying an access destination from the hooked access. Also, the access control unit 106b inquires of the server information storage unit 104 about the label assigned to the folder 304 (204a or 204b) that is an access destination based on the access destination information (step S5). For example, when the network access is for file sharing, the server name and a name of the folder that is an access destination may be acquired as the access destination information.

The server information storage unit 104 searches the server information (see FIG. 4) stored therein for the label of the folder specified by the access destination information, and notifies the access control unit 106b of a search result (step S6).

The access control unit 106b acquires the label of the application 103 (103a or 103b) and the label of the folder that is the access destination and determines whether the network access of the application is permitted by referencing the access control rule (see FIG. 5) stored in the access control rule storage unit 105 (step S7). For example, as illustrated in FIG. 5, when the application has a secret label and the folder that is an access destination also has a secret label, the access control unit 106b determines that the access is to be authorized. Further, even when the application has a public label and the access destination folder also has a public label, the access control unit 106b determines that the access is to be authorized. Meanwhile, when the application has a public label and the folder that is the access destination has a secret label, the access control unit 106b determines that the access is to be prohibited. Further, when the application has a secret label and the folder that is an access destination has the public label, the access control unit 106b determines that only reading is to be authorized.

If it is determined in step S7 that the access is to be prohibited (No in S7), the access control unit 106b prohibits the access of the application and ends the process. An access prohibition method is not particularly limited and, for example, the access may be prohibited by discarding network access packets.

On the other hand, if it is determined in the determination in step S7 that the access is to be authorized (including partial authorization) (Yes in step S7), the access control unit 106b determines whether authentication is required between the first client 100 and the server 300 (step S9). For example, when the access destination is registered in the authentication-required server list, the access control unit 106b determines that the authentication is required and requests the authentication unit 107 to perform the authentication (Yes in step S9). Further, for example, when the access destination is not registered in the authentication-required server list, the access control unit 106b determines that the authentication is not required and executes the network access without requesting the authentication (step S12).

The authentication unit 107 receiving the authentication request from the access control unit 106b performs an authentication process to determine whether the network access control unit 106 has been introduced to the client and is in operation, between the authentication unit 107 and the authentication unit 302 of the server 300 (step S10). Further, the authentication process will be described in detail below.

When the authentication processing result is successful, the authentication unit 107 notifies the access control unit 106b that the authentication is successful. When the access control unit 106b determines authentication success based on the notification (Yes in S11), and executes the network access of the hooked application 103 via the communication unit 101 (step S12).

The network access control unit 307 of the server 300 receives the network access from the application 103 of the first client 100 (S13).

Next, network access to the server 300 of the second client 200 will be described. The application 202 of the second client 200 executed by the control unit (CPU) starts the network access to an access target in a network designated, for example, according to an instruction by a user's manipulation, via the communication unit 201 (step S14).

When the network access control unit 307 of the server 300 receives the network access from the first client 100 or the second client 100 (step S13), the network access control unit 307 executes a second access control process (S15). The second access control process in the network access control unit 307 will be described in detail.

<Flow of Authentication Process>

Figure 10:
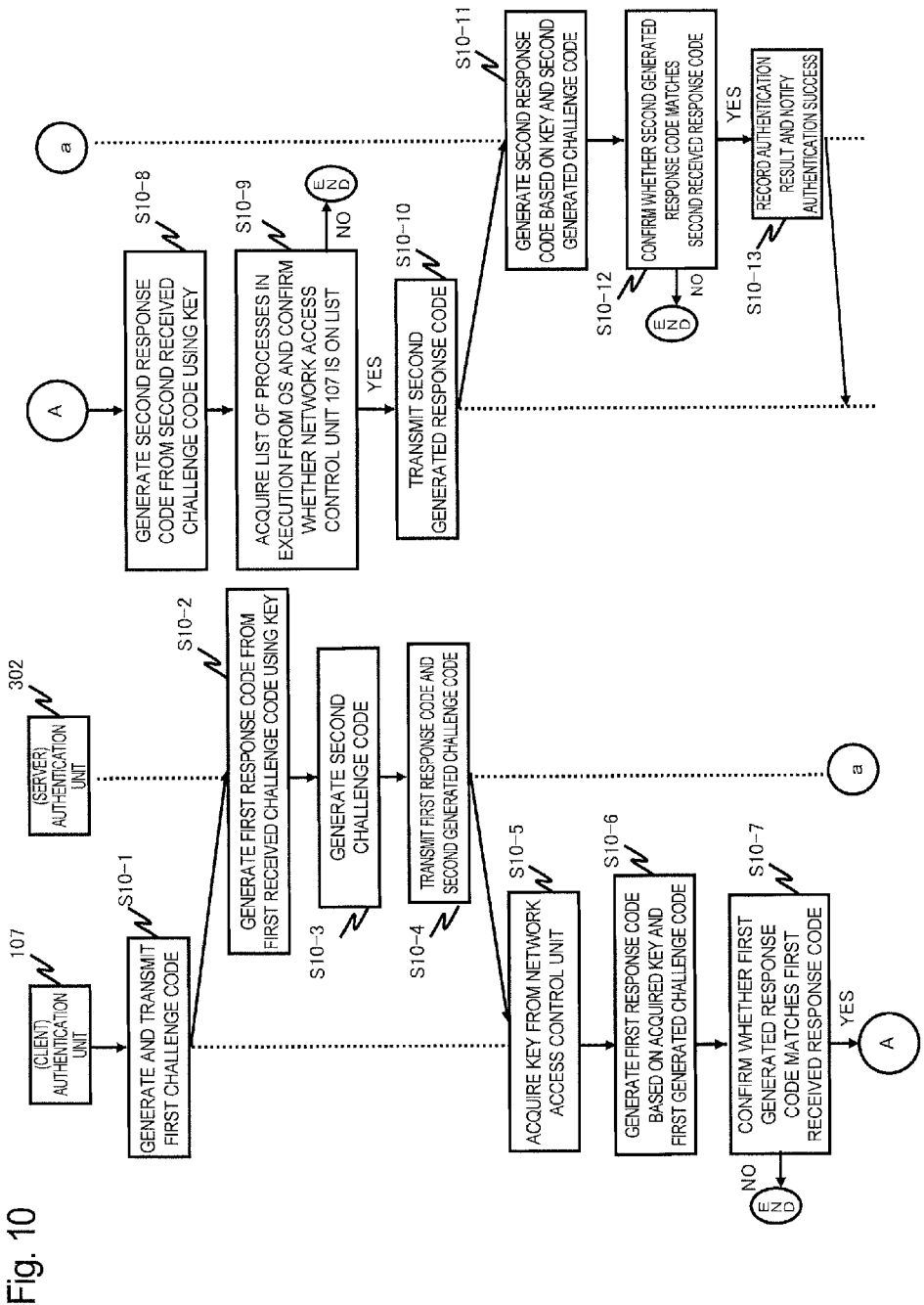
FIG. 10 is a flowchart illustrating an example of a flow of an authentication process.

Next, the authentication process in step S10 of FIG. 9 will be described in detail with reference to FIG. 10. Further, in the present embodiment, a case in which mutual authentication is performed using a challenge response scheme will be described. However, the authentication scheme is not limited thereto and other authentication schemes may be appropriately used, for example, according to a design.

First, the authentication unit 107 of the first client 100 generates a first challenge code and transmits the first challenge code to the authentication unit 302 of the server 300 (step S10-1). The first challenge code may be generated, for example, using a random number.

When the authentication unit 302 of the server 300 receives the first challenge code, the authentication unit 302 generates a first response code from the first challenge code using the key held in the server 300 (step S10-2). For example, the authentication unit 302 may obtain the first response code by converting the key and the first challenge code using a hash function such as SHA1 or MD5.

Next, the authentication unit 302 generates a second challenge code (step S10-3). The second challenge code may be generated, for example, using a random number. The authentication unit 302 transmits the first response code and the second challenge code that have been generated, to the authentication unit 107 of the first client 100 (step S10-4).

The authentication unit 107 of the first client 100 acquires a key from the network access control unit 106 (step S10-5). Also, the authentication unit 107 of the first client 100 generates a first correct response code from the first challenge code generated in step S10-1 and the key acquired from the network access control unit 106 (step S10-6).

The authentication unit 107 compares the first correct response code generated in step S10-6 with the first response code received from the authentication unit 302 of the server 300 to confirm whether they match (step S10-7). When they do not match (NO in step S10-7), the authentication unit 107 fails authentication and ends the process. On the other hand, if they match (YES in step S10-7), the authentication unit 107 generates a second response code for the second challenge code received from the authentication unit 302 of the server 300, using the key acquired from the network access control unit 106 (step S10-8). The authentication unit 107 may obtain the second response code by converting the key and the second challenge code, for example, using a hash function such as SHA1 or MD5.

Next, the authentication unit 107 acquires a list of processes in execution from an operating system, and determines whether the network access control unit 106 is on the list of processes based on the process ID of the network access control unit 106 (step S10-9). If the determination result in step S10-9 is positive (YES in step S10-9), the authentication unit 107 determines that the network access control unit 106 is in operation and transmits the second response code generated in step S10-8 to the authentication unit 302 of the server 300 (step S10-10). On the other hand, if the determination result in step S10-9 is negative (NO in step S10-9), the authentication unit 107 determines that the network access control unit 106 is not in operation, fails the authentication and ends the process.

When the authentication unit 302 of the server 300 receives the second response code, the authentication unit 302 generates a second correct response code from the second challenge code generated in step S10-3 and the key (step S10-11). The authentication unit 302 compares the generated second correct response code with the first response code received from the authentication unit 107 of the first client 100 to confirm whether they match (step S10-12). When they do not match (NO in step S10-12), the authentication unit 302 fails the authentication and ends the process. On the other hand, if they match (YES in step S10-12), the authentication unit 302 succeeds in the authentication and records the first client 100 as an authenticated client in the authenticated client list (step S10-13). For example, when communication is performed using an IP, the authentication unit 302 records identification information (e.g., an IP address, a DNS name, and a machine name) for uniquely specifying the first client 100 in the authenticated client list (see FIG. 8). Further, the authentication unit 302 transmits authentication success to the authentication unit 107 of the first client 100 (step S10-13).

Thus, the authentication process to determine whether the network access control unit 106 has been introduced and is in operation ends.

<Flow of Access Control Process in Server>

Figure 11:
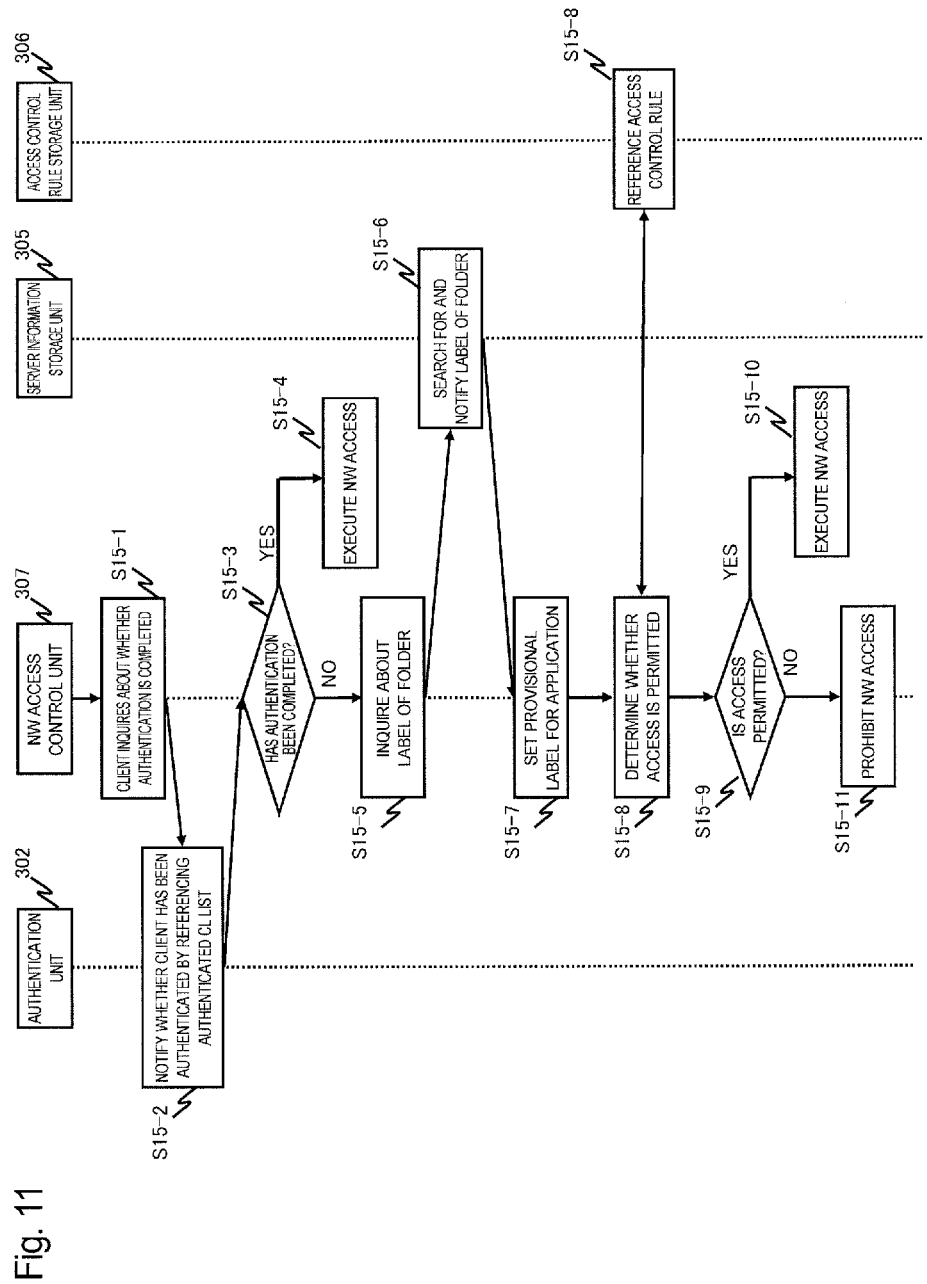
FIG. 11 is a flowchart illustrating an example of a flow of an access control process in a server.
Figure 12:
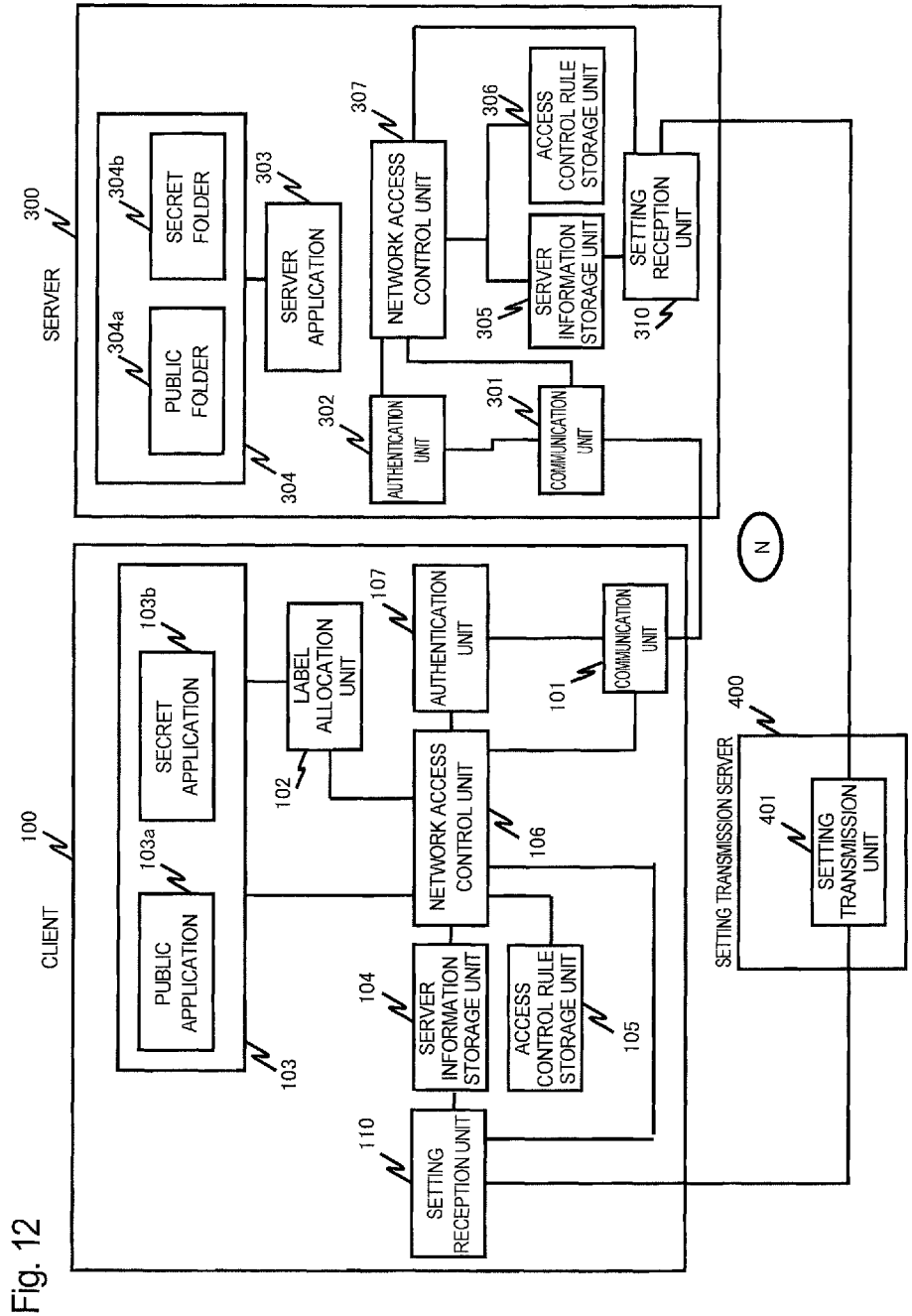
FIG. 12 is a diagram illustrating a schematic configuration of a secret information leakage prevention system according to a second embodiment.

Next, the access control process in the server 300 shown in step S15 in FIG. 9 will be described in detail with reference to FIG. 11.

The network access control unit 307 of the server 300 monitors network access to the server application 303 of the client (100 or 200). When the access is hooked (detected), the network access control unit 307 inquires of the authentication unit 302 about whether the client is an authenticated client (step S15-1). The inquiry includes, for example, an IP address of a client.

For example, when the IP address of the client is registered in the authenticated client list (CL list) (see FIG. 8) stored therein, the authentication unit 302 replies with the fact that the client has been authenticated, and when the IP address of the client is not registered, the authentication unit 302 replies with the fact that the authentication has not been completed (step S15-2).

The network access control unit 307 receives an inquiring result from the authentication unit 302. When the inquiring result is positive (authentication completion) (YES in step S15-3), the network access control unit 307 determines that access control for the access has been already executed, and executes the network access without performing the access control (step S15-4). This is because it is ensured that the client has performed the access control as the client is confirmed to be an authenticated client, and accordingly the server need not perform the access control again.

On the other hand, if the inquiring result is negative (authentication has not been completed) (NO in step S15-3), the network access control unit 307 determines that access control for the access is not executed and the server performs the access control. For example, this is a case in which the access is network access from the first client 100 whose network access control unit 106 is not in operation or network access from the second client 200 to which the network access control unit has not been introduced. The network access control unit 307 acquires the access destination information for specifying an access destination from the received network access, and inquires of the server information storage unit 305 about a label assigned to the folder 304 (204a or 204b) that is an access destination based on the access destination information (step S15-5).

The server information storage unit 305 searches the server information (see FIG. 4) stored therein for the label of the folder specified by the access destination information and notifies the network access control unit 307 of a search result (step S15-6).

Next, since the information for specifying the label of the application is not contained in the network access or a label is not originally set for an application to be accessed, the network access control unit 307 sets a provisional label as the label of the application (S15-7). Content of the provisional label may be appropriately set according to a specification, and in the present embodiment, for example, a "public" level is set.

The network access control unit 307 determines whether the access is permitted by referencing the access control rule stored in the access control rule storage unit 306 based on the provisional label set for the application and the label of the folder that is an access destination (see FIG. 5) (S15-8). For example, since "public" has been set as a provisional label for the application, when the "secret" label has been set for the folder that is the access destination, the access is prohibited, and when the "public" label has been set for the folder as the access destination, the access is authorized.

When the determination result indicates access prohibition (NO in S15-9), the network access control unit 307 prohibits the network access to the folder of the application (S15-11). An access prohibition method is not particularly limited and for example, network access packets may be discarded for prohibition. Further, for example, the access may be prohibited by rewriting a network access command with a fraudulent command so that the server application 303 reliably returns an error.

Meanwhile, when the determination result indicates access authorization, the network access control unit 307 executes the network access to the folder of the application (step S15-10).

Thus, in the secret information leakage prevention system according to the first embodiment, the network access control unit is provided in the client, making it possible for the client to execute the access control for realizing multilevel security. Also, in the secret information leakage prevention system, the network access control unit at the server side does not perform the access control when the client performs the network access control, and performs the access control when the client does not perform the network access control. Accordingly, a load of the network access control can be distributed to the server and the client. As a result, it is possible to provide a network-attached multilevel security system that enables communication between the server and the client to be performed at a higher speed even when there are a number of client terminals.

Further, in the secret information leakage prevention system, since both the network access control unit at the client side and the network access control unit at the server side execute the access control based on the same server information and access control rule, no difference in the authentication result due to presence or absence of the authentication history occurs. Accordingly, it is possible to prevent convenience of a user task from being degraded.

Further, in the secret information leakage prevention system, the network access control unit at the server side performs the access control by setting, for example, provisional labels for access of clients other than the authenticated client. Accordingly, for example, access to the server of a client that fails in the authentication such as a client brought from the outside of the company is not prohibited and public folders can be used. As a result, it is possible to improve convenience of the user task while preventing information leakage.

Further, in the secret information leakage prevention system, the authentication unit of the server does not authenticate the client when the network access control unit at the client side is not in operation. As a result, even in network access of a client whose network access control unit is not in operation, it is possible to more reliably prevent information leakage since the access control is performed at the server side.

<Variant of First Embodiment>

When the server 300 receives a network access request containing the label of the application from a client (not shown) to which related art has been applied, the server 300 may execute the access control depending on the label according to the related art.

Further, while the authentication unit 302 of the server 300 holds the authenticated client list (FIG. 8) as described above, the authentication unit 107 of the first client 100 may also hold an authenticated server list having an IP address or a name of the authenticated server 300 recorded therein. In this case, when the authentication unit 107 of the first client 100 determines whether the authentication is required in step S9 of FIG. 9, the authentication unit 107 determines whether the server is an authenticated server by referencing the authenticated server list. If the server is an authenticated server, the authentication unit 107 may omit the authentication process with the server. Accordingly, since the authentication process may be omitted at the time of communication with the server requiring the authentication, a load can be reduced and higher-speed communication can be performed.

Further, the authenticated client list may further store a remaining time for which the authentication is valid, as illustrated in FIG. 8. In this case, the authentication unit 302 of the server 300 subtracts the valid time according to a predetermined timing (e.g., every second). When the valid time becomes 0, the authentication unit 302 may delete the corresponding entry from the list. Further, before the valid time becomes 0, the authentication process may be performed again and the valid time of the authentication may be reset. In this case, since the authentication is performed every certain time, the regular first client 100 or server 300 can be prevented from being replaced with a fraudulent client or server.

Further, the authenticated client list of the authentication unit 302 or the authenticated server list of the authentication unit 107 has the IP address or the name, as well as a port number used by the application 103 of the first client 100 recorded therein. Also, when the application 103 ends and the network is disconnected, the entry may be deleted from the authenticated client list or the authenticated server list based on the port number. In the case of this operation, since re-authentication is performed only during a period in which the application 103 is communicating, unnecessary re-authentication can be avoided.

Further, while the labels have been described as two types of secret and public in the above description, two or more types of labels may be used. For example, four types of labels such as secret, top secret, confidential, and unclassified may be assigned. In this case, the network access control unit 106 prohibits information distribution from the application 103 or the folder 304 with a label having a low security level to the application 103 or the folder 304 with a label having a high security level, as in the public multilevel security system.

Further, while the case in which the same security level is applied to the public application 103a of the first client 100 and the application 202 of the second client 200 has been described above, different security levels may be applied. For example, a "public" label may be set for the public application 103a, and an "unclassified" label may be set for the application 202. "Unclassified" may have a lower security level than "public." In this case, it is possible to perform finer access control.

Further, while one folder is accessed by one network access as described above, a plurality of folders may be accessed. In this case, the network access control means 307 confirms whether the accessing client is an authenticated client at the time of initial access. If the client is not an authenticated client, the determination as to whether the access is permitted and the control may be performed each time the folder is accessed.

Further, while the case in which the network access control unit 106 and the network access control unit 307 authorize the network access of the application 103 has been described above, a process such as encryption or log recording may be performed according to the labels. Accordingly, it is possible to provide a system capable of controlling a security function according to the security levels.

Further, while the case in which the network access control unit 106 and the network access control unit 307 control reading from and writing to the folder 304 has been described above, content of the network access control is not limited thereto. For example, when the network access of the application is not for reading from and writing to the folder but for transmission and reception of electronic mail, the network access control unit 106 may perform control of transmission and reception for a mail address. Further, the network access control unit 106 may control process communication of the server 300.

Further, the authentication-required server list of the network access control unit (106 or 307) described above or a database having the label information of the folder of the server information storage unit (104 or 305) recorded therein may be defined for each user, and the authentication-required server list or the database may be switched by a log-in user. This operation enables the access control to be performed according to the users.

Further, the authentication unit 107 of the first client 100 and the authentication unit 302 of the server 300 may confirm that falsification of the network access control unit 106 has not been performed at a predetermined timing during the authentication process. A confirmation method is not particularly limited and for example, the authentication unit 107 transmits a hash value of an execution binary of the network access control unit 106 to the authentication unit 302 of the server 300 at a timing of step S10-10 of FIG. 10. The authentication unit 302 of the server 300 compares the hash value received from the authentication unit 107 with a previously held hash value of the execution binary of the network access control unit 106 to determine whether they match. If they match, the authentication unit 302 confirms that falsification of the network access control unit 106 has not been performed. On the other hand, when they do not match, the authentication unit 302 determines that the falsification of the network access control unit 106 has been performed, regards the authentication to have failed, and ends the process.

Further, while the case in which the access control unit 106b holds the authentication-required server list and determines whether the authentication is required by referencing the authentication-required server list has been described above, a method of determining whether the authentication is required is not limited thereto. For example, the access control unit 106b may determine whether the authentication is required using the server/folder information (see FIG. 4) held in the server information storage unit 104. Specifically, the access control unit 106b may acquire the server/folder information of the server that is an access destination from the server information storage unit 104. When the secret folder is included in the acquired folder information, the access control unit 106b may determine the server as a server requiring the authentication since the server holds the secret folder.

Further, while the case in which the authentication unit 107 performs confirmation of the introduction of the network access control unit 106 using the key and confirmation of the operation of the network access control unit 106 using the process list has been described above, the authentication unit 107 may perform only the introduction confirmation. Specifically, the authentication unit 107 may execute the process of step S10-8 in FIG. 10, omit the process of step S10-9 and then execute the process of step S10-10. This makes it possible to perform the authentication process at a higher speed.

Second Embodiment

Next, a second embodiment will be described in detail with reference to FIG. 11. A description of the same parts as those in the first embodiment will be omitted. The second embodiment differs from the first embodiment in that a first client 100 further includes a setting reception unit 110, a server 300 further includes a setting reception unit 310, and a setting transmission server 400 includes a setting transmission unit 401, as illustrated in FIG. 11. Further, a description of a second client will be omitted for convenience of description.

The setting transmission unit 401 of the setting transmission server 400 stores server information, an authentication-required server list and a key for authentication stored therein. The setting transmission unit 401 transmits the server information, the authentication-required server list and the key for authentication to the setting reception unit 110 of the first client 100, and transmits the server information and the key for authentication to the setting reception unit 310 of the server 300.

When the setting reception unit 110 of the first client 100 receives the server information, the authentication-required server list and the key for authentication, the setting reception unit 110 updates the server information stored in the server information storage unit 104 and the authentication-required server list and the key for authentication stored in the network access control unit 106. Meanwhile, when the setting reception unit 310 of the server 300 receives the server information and the key for authentication, the setting reception unit 310 updates the server information stored in the server information storage unit 305 or the key held in the authentication unit 302.

According to the second embodiment, the server information, the authentication-required server list, and the key used for authentication can be remotely updated. Particularly, when there are a plurality of first clients 100 or a plurality of servers 300, management can be made efficient.

Other Embodiments

Further, the present invention is not limited to the above embodiments and may be implemented in various other forms without departing from the scope and spirit of the present invention. For this reason, the above embodiments are only simple examples and should not be construed as limiting. For example, the respective process steps described above may be executed in an arbitrarily changed order or in parallel without causing contradiction of process content.

In the embodiments described above, the server 300 is realized by one device, but in the present invention, the server 300 may be realized by a plurality of devices. In this case, the functions of the server 300 in the embodiments described above may be distributed to the plurality of devices, and a group of the plurality of devices may function as the server 300 in the embodiments described above.

This application claims the benefits of Japanese Patent Application No. 2010-145099, filed Jun. 25, 2010, the disclosure of which is hereby incorporated herein by references in its entirety.

While the present invention has been described above with reference to the embodiments, the present invention is not limited to the embodiments. Various changes that can be understood by those skilled in the art may be made to the configuration or details of the present invention within the scope of the present invention.

Some or all of the embodiments are described in the following notes, but are not limited to the following:

(Note 1)

A secret information leakage prevention system in which two or more clients, each including an application program that transmits a network access request, and a server are able to communicate via a network, wherein: at least one of the two or more clients includes first network access control means for controlling the network access request transmitted from the application program to the server, based on a security level assigned to the application program, and the server includes second network access control means for determining, in response to the network access request transmitted from one of the two or more clients, whether the first network access control means has been introduced to the client that has transmitted the network access request, authorizing the network access request when the determination result is positive, and controlling the network access request based on a security level assigned to an access target of the network access request when the determination result is negative.

(Note 2)

The secret information leakage prevention system according to Note 1, wherein the client including the first network access control means includes first authentication means for executing an authentication process of authenticating, with the server, that the first network access control means has been introduced, the server includes second authentication means for executing the authentication process with the client including the first network access control means, and registering the client as an authenticated client when the authentication process is successful, and the second network access control means determines, when the client having transmitted the network access request is registered as the authenticated client, that the first network access control means has been introduced to the client.

(Note 3)

The secret information leakage prevention system according to Note 1 or 2, wherein: the second network access control means sets a provisional security level for the application that has transmitted the network access request when the determination result is negative and controls the network access request based on the set provisional security level and the security level assigned to the access target.

(Note 4)

The secret information leakage prevention system according to Note 2 or 3, wherein: the first authentication means executes the authentication process with the second authentication means using a key held in the first network access control means.

(Note 5)

The secret information leakage prevention system according to any one of Notes 2 to 4, wherein: the first authentication means includes: first transmission means for transmitting a first challenge code generated using a first random number to the server; first reception means for receiving a first response code and a second challenge code based on the first challenge code that are transmitted from the server; first response code generation means for generating a first response code based on a first key held in the first network access control means and the generated first challenge code; first determination means for determining whether the first response code received by the first reception means matches the first response code generated by the first response code generation means; and second transmission means for transmitting a second response code generated from the second challenge code received by the first reception means to the server when the determination result from the first determination means is positive, and the second authentication means includes: third transmission means for transmitting, to the client, a first response code generated using a second key held in the second authentication means from the first challenge code transmitted from the first client and a second challenge code generated using a second random number; second reception means for receiving the second response code based on the second challenge code and transmitted from the first client; second response code generation means for generating a second response code based on the second key and the generated second challenge code; and second determination means for determining whether the second response code transmitted from the first client matches the second response code generated by the second response code generation means, and regarding the authentication process as being successful when the determination result is positive.

(Note 6)

The secret information leakage prevention system according to any one of Notes 2 to 5, wherein the first authentication means executes the authentication process with the server on the condition that the first network access control means is in operation.

(Note 7)

The secret information leakage prevention system according to Note 6, wherein the first authentication means acquires a list of processes in execution from an operating system, and determines whether the first network access control means is in operation by confirming whether the first network access control means is included in the acquired process list.

(Note 8)

A secret information leakage prevention method in a secret information leakage prevention system in which two or more clients, each including an application program that transmits a network access request, and a server are able to communicate via a network, wherein at least one of the two or more clients executes a first network access control step of controlling the network access request transmitted from the application program to the server, based on a security level assigned to the application program, and the server executes a second network access control step of determining, in response to the network access request transmitted from one of the two or more clients, whether the first network access control step is executed in the client that has transmitted the network access request, authorizing the network access request when the determination result is positive, and controlling the network access request based on a security level assigned to an access target of the network access request when the determination result is negative.

(Note 9)

A program for causing at least one of two or more clients, each including an application program that transmits a network access request, to execute a first network access control step of controlling the network access request transmitted from the application program to the server, based on a security level assigned to the application program, and causing the server to execute a second network access control step of determining, in response to the network access request transmitted from one of the two or more clients, whether the first network access control step is executed in the client that has transmitted the network access request, authorizing the network access request when the determination result is positive, and controlling the network access request based on a security level assigned to an access target of the network access request when the determination result is negative.

The present invention is suitable for provision of a network-attached multilevel security system capable of performing high-speed communication and improving convenience of a user task even when there are a number of client terminals.

10 . . . CPU, 11 . . . ROM, 12 . . . RAM, 13 . . . external storage device, 14 . . . communication interface, 15 . . . input interface, 16 . . . output interface, 100 . . . client, 101 . . . communication unit, 102 . . . label allocation unit, 103 . . . application, 103$a$ . . . public application, 103$b$ . . . secret application, 104 . . . server information storage unit, 105 . . . access control rule storage unit, 106 . . . network access control unit, 106$a$ . . . monitoring unit, 106$b$ . . . access control unit, 107 . . . authentication unit, 200 . . . client, 201 . . . communication unit, 202 . . . application, 300 . . . server, 301 . . . communication unit, 302 . . . authentication unit, 303 . . . server application, 304 . . . folder, 304$a$ . . . public folder, 304$b$ . . . secret folder, 305 . . . server information storage unit, 306 . . . access control rule storage unit, 307 . . . network access control unit, N . . . network

I claim:

1. A secret information leakage prevention system in which two or more clients, each including an application program that transmits a network access request, and a server are able to communicate via a network, wherein:
    at least one of the two or more clients includes first network access control unit for controlling the network access request transmitted from the application program to the server, based on a security level assigned to the application program,
    the server includes second network access control unit for determining, in response to the network access request transmitted from one of the two or more clients, whether the first network access control unit has been introduced to the client that has transmitted the network access request, the second network access control unit authorizing the network access request without controlling the network access request when the determination result is positive, the second network access control unit controlling the network access request based on a security level assigned to an access target of the network access request when the determination result is negative; and
    the first network access control unit and the second network access control unit control the application program based on the same security level.

2. The secret information leakage prevention system according to claim 1, wherein
    the client including the first network access control unit includes first authentication unit for executing an authentication process of authenticating, with the server, that the first network access control unit has been introduced,
    the server includes second authentication unit for executing the authentication process with the client including the first network access control unit, and registering the client as an authenticated client when the authentication process is successful, and the second network access control unit determines, when the client having transmitted the network access request is registered as the authenticated client, that the first network access control unit has been introduced to the client.

3. The secret information leakage prevention system according to claim 1, wherein the second network access control unit sets a provisional security level for the application that has transmitted the network access request when the determination result is negative and controls the network access request based on the set provisional security level and the security level assigned to the access target.

4. The secret information leakage prevention system according to claim 2, wherein the first authentication unit executes the authentication process with the second authentication unit using a key held in the first network access control unit.

5. The secret information leakage prevention system according to claim 2, wherein the first authentication unit includes:
first transmission unit for transmitting a first challenge code generated using a first random number to the server;
first reception unit for receiving a first response code and a second challenge code based on the first challenge code that are transmitted from the server;
first response code generation unit for generating a first response code based on a first key held in the first network access control unit and the generated first challenge code;
first determination unit for determining whether the first response code received by the first reception unit matches the first response code generated by the first response code generation unit; and
second transmission unit for transmitting a second response code generated from the second challenge code received by the first reception unit to the server when the determination result from the first determination unit is positive, and the second authentication unit includes:
third transmission unit for transmitting, to the client, a first response code generated using a second key held in the second authentication unit from the first challenge code transmitted from the first client and a second challenge code generated using a second random number;
second reception unit for receiving the second response code based on the second challenge code and transmitted from the first client;
second response code generation unit for generating a second response code based on the second key and the generated second challenge code; and
second determination unit for determining whether the second response code transmitted from the first client matches the second response code generated by the second response code generation unit, and regarding the authentication process as being successful when the determination result is positive.

6. The secret information leakage prevention system according to claim 2, wherein the first authentication unit executes the authentication process with the server on the condition that the first network access control unit is in operation.

7. The secret information leakage prevention system according to claim 6, wherein the first authentication unit acquires a list of processes in execution from an operating system, and determines whether the first network access control unit is in operation by confirming whether the first network access control unit is included in the acquired process list.

8. A secret information leakage prevention method in a secret information leakage prevention system in which two or more clients, each including an application program that transmits a network access request, and a server are able to communicate via a network, wherein:

at least one of the two or more clients executes a first network access control step of controlling the network access request transmitted from the application program to the server, based on a security level assigned to the application program, the server executes a second network access control step of determining, in response to the network access request transmitted from one of the two or more clients, whether the first network access control step is executed in the client that has transmitted the network access request, the second network access control step authorizing the network access request without controlling the network access request when the determination result is positive, the second network access control step controlling the network access request based on a security level assigned to an access target of the network access request when the determination result is negative; and the first network access control step and the second network access control step control the application program based on the same security level.

9. A non-transitory computer readable storage medium storing a program for:

causing at least one of two or more clients, each including an application program that transmits a network access request, to execute a first network access control step of controlling the network access request transmitted from the application program to the server, based on a security level assigned to the application program; and causing the server to execute a second network access control step of determining, in response to the network access request transmitted from one of the two or more clients, whether the first network access control step is executed in the client that has transmitted the network access request, the second network access control step authorizing the network access request without controlling the network access request when the determination result is positive, the second network access control step controlling the network access request based on a security level assigned to an access target of the network access request when the determination result is negative;

wherein the first network access control step and the second network access control step control the application program based on the same security level.

10. A server which is able to communicate via a network two or more clients, each including an application program that transmits a network access request, wherein:

at least one of the two or more clients includes first network access control unit for controlling the network access request transmitted from the application program to the server, based on a security level assigned to the application program, the server includes second network access control unit for determining, in response to the network access request transmitted from one of the two or more clients, whether the first network access control unit has been introduced to the client that has transmitted the network access request, the second network access control unit authorizing the network access request without controlling the network access request when the determination result is positive, the second network access control unit controlling the network access request based on a security level assigned to an access target of the network access request when the determination result is negative; and the first network access control unit and the second network access control unit control the application program based on the same security level.

11. A secret information leakage prevention method in a server which is able to communicate via a network two or more clients, each including an application program that transmits a network access request, wherein:

at least one of the two or more clients executes a first network access control step of controlling the network access request transmitted from the application program to the server, based on a security level assigned to the application program, the server executes a second network access control step of determining, in response to the network access request transmitted from one of the two or more clients, whether the first network access control step is executed in the client that has transmitted the network access request, the second network access control step authorizing the network access request without network access control step when the determination result is positive, the second network access control step controlling the network access request based on a security level assigned to an access target of the network access request when the determination result is negative;

the first network access control step and the second network access control step control the application program based on the same security level.

12. A non-transitory computer readable storage medium storing a program for causing a computer to function as a server which is able to communicate via a network two or more clients, each including an application program that transmits a network access request, wherein:

at least one of the two or more clients includes a first network access control unit for controlling the network access request transmitted from the application program to the server, based on a security level assigned to the application program at, the program causes the computer to function as:

a second network access control unit for determining, in response to the network access request transmitted from one of the two or more clients, whether the first network access control unit has been introduced to the client that has transmitted the network access request, the second network access control unit authorizing the network access request without controlling the network access request when the determination result is positive, the second network access control unit controlling the network access request based on a security level assigned to an access target of the network access request when the determination result is negative; and the first network access control unit and the second network access control unit control the application program based on the same security level.

* * * * *